No. 621,226. Patented Mar. 14, 1899.
G. T. CHATTERTON.
CHAFE IRON FOR VEHICLES.
(Application filed Jan. 30, 1899.)
(No Model.)

Witnesses.
H. G. Homer
L. M. McKean

Inventor.
George T. Chatterton
By M. D. Peck
His Attorney.

THE NORRIS PETERS CO., PHOTO-LITHO., WASHINGTON, D. C.

UNITED STATES PATENT OFFICE.

GEORGE T. CHATTERTON, OF CORTLAND, NEW YORK.

CHAFE-IRON FOR VEHICLES.

SPECIFICATION forming part of Letters Patent No. 621,226, dated March 14, 1899.

Application filed January 30, 1899. Serial No. 703,896. (No model.)

*To all whom it may concern:*

Be it known that I, GEORGE T. CHATTERTON, a citizen of the United States, residing at Cortland, in the county of Cortland and State of New York, have invented certain new and useful Improvements in Chafe-Irons; and I do hereby declare the following to be a full, clear, and exact description of the invention, such as will enable others skilled in the art to which it appertains to make and use the same, reference being had to the accompanying drawings, which form part of this specification.

My invention relates to chafe-irons for vehicles, its object being to improve the construction of such devices whereby the roller may be easily fitted into its bearings on the supporting-plate and be securely held therein and prevented from rattling and be subject to a minimum of friction when turned in its bearing; and the invention consists in the several details of construction and combination of parts, as will be hereinafter fully described, and more particularly pointed out in the claim.

Figure 1:
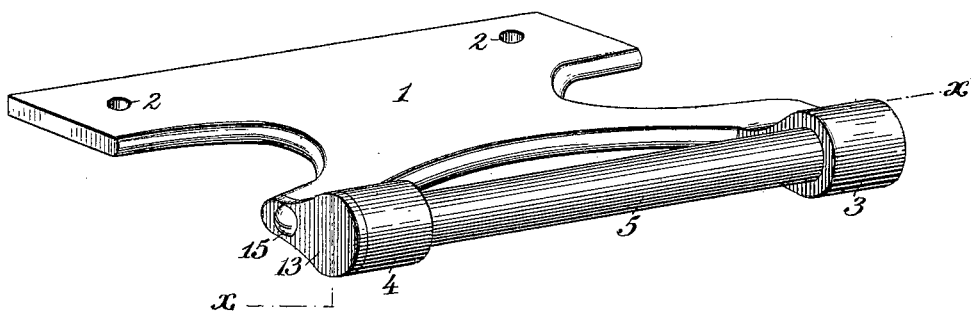
Figure 2:
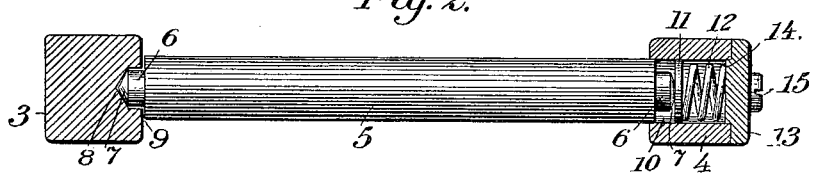
Figure 3:
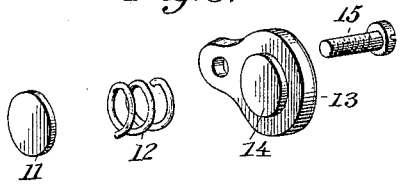

In the accompanying drawings, Figure 1 is a perspective view of a chafe-iron made in accordance with my invention. Fig. 2 is a sectional view on the line $x\,x$ of Fig. 1. Fig. 3 is a group of detached parts, all being shown in perspective.

Similar reference-numerals indicate corresponding parts in each figure of the drawings.

The supporting-plate (indicated by 1) is provided with openings 2 for the passage of screws or similar fastening devices, by which it may be secured to the body of the vehicle. The plate is also provided with two forwardly-extending ears 3 and 4, in which the roller 5 is journaled. The roller 5 is formed with reduced ends 6, which form its journals, and the ends of these journals are convex, as shown at 7.

A recess 8 is formed in the inner face of the ear 3, the inner end of which is concave, and this recess forms the bearing for one of the journals 6. The recess is of a depth somewhat less than the length of the journal and of a diameter somewhat greater, and when the parts are assembled the only part of the journal in actual contact with the walls of the recess will be its convex end, which will engage the concave end of the recess. The shoulder 9 on the roller will also be out of contact with the ear 3, and friction at this end will thus be very little.

The ear 4 is provided with an opening 10, extending entirely through it and of such diameter as to permit the roller to pass through it and turn freely therein without any appreciable lateral play. The roller must be of such length that when in position it will extend into the ear 4 only a very short distance, just sufficient to hold it against lateral movement. 11 indicates a disk which fits snugly in the opening 10 and bears against the convex end of the journal 6 in said opening. A spiral spring 12 is also inserted in said opening and abuts at its inner end against the disk 11.

In order to secure the spring 12 and disk 11 in place, I provide a pivoted cap-plate 13, adapted to fit against the outer face of the ear 4 and having a circular projection 14 on its inner face to enter the opening 10 and bear against the outer end of the spring 12. The cap-plate is pivotally secured in place, preferably by a screw 15, which passes through it into a threaded opening in the ear 4. When the screw is partially inserted, the cap-plate may be swung to one side or the other, leaving a free opening for the insertion of the roller 5. The plate is then seated over the opening, with the projection 14 extending therein, and is firmly secured by the insertion of the screw. The several parts are so proportioned that when the cap-plate is secured in place the spring 12 will be compressed and exert a pressure on the disk 11, thus holding it firmly against the end of the journal 6 in the opening 10 and effectually preventing the roller from rattling.

From the foregoing description it will be seen that I have provided an exceedingly simple and efficient construction which enables the roller to be easily and quickly fitted into its bearings or removed therefrom, that almost all the friction is on the convex ends of the journals and is consequently at a minimum, and also that the roller is effectually prevented from rattling.

Having fully described my invention, what I claim as new, and desire to secure by Letters Patent, is—

In a chafe-iron, the combination with a supporting-plate having a pair of forwardly-projecting ears, one of said ears having a recess formed in its inner face, the end of said recess being concave, and the other having an opening extending through it of greater diameter than the recess, of a roller having reduced ends forming journals, said journals having convex ends, and the roller being of substantially the same diameter as said opening and adapted to be inserted through it to seat one of the convex journals in said concave recess and leave the other journal within said opening, a disk to fit loosely in said opening and bear against the convex end of the journal, a spring bearing against the disk, a pivoted cap-plate adjusted to fit against the outer face of the ear and having a projection to extend into the opening to compress the spring, and means to secure the cap-plate to the ear, as and for the purpose set forth.

In testimony whereof I have signed my name in presence of two witnesses.

GEORGE T. CHATTERTON.

Witnesses:
 JESSE VAN DENBURGH,
 W. A. HOWARD.